US012683108B2

(12) United States Patent
Wu et al.

(10) Patent No.: US 12,683,108 B2
(45) Date of Patent: Jul. 14, 2026

(54) AIR-BLOWING TRIPPING MECHANISM AND MOLDED CASE CIRCUIT BREAKER

(71) Applicant: ZHEJIANG CHINT ELECTRICS CO., LTD., Zhejiang (CN)

(72) Inventors: Xiaolong Wu, Zhejiang (CN); Haifeng Wan, Zhejiang (CN); Fenghu Ni, Zhejiang (CN); Shangjing Wei, Zhejiang (CN); Yongfu Xu, Zhejiang (CN); Shichang Hong, Zhejiang (CN); Jian Zhou, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 281 days.

(21) Appl. No.: 18/557,014

(22) PCT Filed: Oct. 17, 2022

(86) PCT No.: PCT/CN2022/125643
§ 371 (c)(1),
(2) Date: Oct. 24, 2023

(87) PCT Pub. No.: WO2023/103589
PCT Pub. Date: Jun. 15, 2023

(65) Prior Publication Data

US 2024/0203680 A1 Jun. 20, 2024

(30) Foreign Application Priority Data

Dec. 7, 2021 (CN) ......................... 202111483705.X

(51) Int. Cl.
*H01H 71/10* (2006.01)
*H01H 71/02* (2006.01)
*H01H 73/18* (2006.01)

(52) U.S. Cl.
CPC .... *H01H 71/1009* (2013.01); *H01H 71/0207* (2013.01); *H01H 73/18* (2013.01)

(58) Field of Classification Search
CPC ............. H01H 1/2041; H01H 71/1009; H01H 71/0207; H01H 71/1027; H01H 71/0271;
(Continued)

(56) References Cited

U.S. PATENT DOCUMENTS 8,558,126 B2 * 10/2013 An ..................... H01H 71/1009 335/10
8,664,550 B2 * 3/2014 Ao ....................... H01H 73/045 218/7
(Continued)

FOREIGN PATENT DOCUMENTS

CN 103021750 * 4/2013 ......... H01H 71/0271
CN 104465214 * 3/2015 ............. H01H 33/86
(Continued)

OTHER PUBLICATIONS

Translation of CN103021750 (Original document published Mar. 4, 2013) (Year: 2013).*
(Continued)

*Primary Examiner* — William A Bolton
(74) *Attorney, Agent, or Firm* — OSTROLENK FABER LLP

(57) ABSTRACT

An air-blowing tripping mechanism that is driven by gas, and includes a housing having a sealing cavity with an air-blowing channel blocked by an insulating partition plate that is blown by the gas to move, whereby the gas enters the sealing cavity, and a push rod rotationally connected to the housing. The push rod includes a rotating arm rotationally connected aside of the sealing cavity, and a reset arm. One end of the rotating arm has an operating portion opposite to an operating mechanism of a circuit breaker, and the other
(Continued)

end of the rotating arm has an air-blowing end that extends into the sealing cavity, is located on one side of the insulating partition plate and can drive the rotating arm to rotate under the action of the gas. The reset arm is on the rotating arm and used for driving the push rod to reset.

12 Claims, 8 Drawing Sheets

(58) Field of Classification Search
CPC ........ H01H 71/12; H01H 71/02; H01H 71/50; H01H 73/18; H01H 77/02; H01H 2077/025
USPC ....... 200/19.36, 17 R, 50.32; 218/153, 7, 43, 218/68
See application file for complete search history.

(56) References Cited

U.S. PATENT DOCUMENTS 8,698,024 B2 * 4/2014 Woodson ........... H01H 71/1009 200/332
10,460,898 B2 * 10/2019 Kim ................... H01H 71/2472
2001/0045879 A1 * 11/2001 Reichard ................ H01H 77/02 335/172
2002/0050892 A1 5/2002 Kaneko et al.
2002/0130744 A1 * 9/2002 Jodehl .................... H01H 77/10 335/172
2014/0375400 A1 * 12/2014 Bertrand ............ H01H 11/0062 335/21
2017/0323741 A1 11/2017 Weber et al.

FOREIGN PATENT DOCUMENTS

CN 108288570 A 7/2018
CN 212874360 U 4/2021
CN 212874402 U 4/2021
CN 112885668 6/2021
CN 217061975 U 7/2022

OTHER PUBLICATIONS

Translation of CN104465214 (Original document published Mar. 25, 2015) (Year: 2015).*
International Search Report mailed Dec. 19, 2022 in corresponding PCT International Application No. PCT/CN2022/125643.
Extended European Search Report mailed Mar. 27, 2025 in corresponding European Application No. 22903013.5.

* cited by examiner

AIR-BLOWING TRIPPING MECHANISM AND MOLDED CASE CIRCUIT BREAKER

CROSS-REFERENCE TO RELATED APPLICATIONS

The present application is a 35 U.S.C. §§ 371 national stage application of International Application No. PCT/CN2022/125643, filed Oct. 17, 2022, which claims priority to Chinese Patent Application No. 202111483705.X, filed Dec. 7, 2021, the contents of which are incorporated herein by reference.

TECHNICAL FIELD

The present invention relates to a low-voltage electrical appliance, and more particularly, to an air-blowing tripping mechanism and a molded case circuit breaker.

BACKGROUND ART

In a low-voltage power distribution system, a circuit breaker serves as an important device to protect the safety of power supply. In an air-blowing tripping structure of a molded case circuit breaker, when the circuit breaker is short-circuited, a gas in an arc extinguishing chamber drives a push rod to move through an air-blowing channel of a housing, such that a product trips. In the existing molded case circuit breaker, a push rod in an air-blowing tripping mechanism is installed in cooperation with a resetting mechanism such as a pressure spring or a torsion spring, and the resetting is realized after tripping. Such structure has low production efficiency and needs to be additionally provided with a spring, which is prone to the risk of failure or falling off.

SUMMARY OF THE INVENTION

An objective of the present invention is to overcome the defects of the prior art and provide an air-blowing tripping mechanism and a molded case circuit breaker, which have a simple structure and high reliability.

In order to achieve the above object, the technical scheme adopted in the present invention is as follows:

An air-blowing tripping mechanism, comprising a housing and a push rod rotationally connected to the housing, wherein the housing is provided with a sealing cavity provided with an air-blowing channel, the air-blowing channel is blocked by an insulating partition plate, and a gas is able to blow the insulating partition plate to move, so as to enter into the sealing cavity; the push rod comprises a rotating arm and a reset arm which are integrally arranged; the rotating arm is rotationally connected and a rotational joint of the rotating arm is on one side of the sealing cavity; one end of the rotating arm is provided with an operating portion opposite to an operating mechanism of the circuit breaker, and another end of the rotating arm is provided with an air-blowing end; the air-blowing end extends into the sealing cavity, is located on one side of the insulating partition plate and can drive the rotating arm to rotate under the action of the gas; and the elastic reset arm is disposed on one side of the rotating arm and used for driving the push rod to reset.

Further, one end of the reset arm is connected to the rotating arm; a gap is reserved between the reset arm and the rotating arm; a clamping portion is disposed at another end of the reset arm; and the clamping portion props within a clamping groove formed on the housing.

Further, the reset arm is provided with a plurality of curved arc-shaped portions.

Further, an opening through which the air-blowing end extends is formed on one side of the sealing cavity; the air-blowing end extends into the sealing cavity through the opening; a rotating center which is rotatably connected to the housing is provided in the middle of the rotating arm; a sealing portion is disposed between the rotating center and the air-blowing end; and during a swing course of the push rod, the sealing portion blocks the opening to keep the sealing cavity in a sealed state.

Further, a sealing protrusion is disposed at the opening; a matching groove is correspondingly formed in the sidewall between the sealing portion and the air-blowing end; and during the swing course of the push rod, the matching groove is in sliding fit with the sealing protrusion.

Further, a length of an arc-shaped surface of the sealing portion that blocks the opening is greater than an opening length of the opening, and during the swing course of the push rod, the sealing portion always blocks the opening, or always blocks a side of the opening close to the air-blowing channel.

Further, two air-blowing channels are respectively provided on both sides of the sealing cavity; one end of each of the two air-blowing channels is communicated with an arc extinguishing system of an adjacent circuit breaker pole, and another end of each of the two air-blowing channels serves as a second air-blowing port and is blocked by an insulating partition plate; the insulating partition plate is of U-shaped and disposed in the sealing cavity; and the insulating partition plate comprises a connecting wall and a pair of elastic walls, wherein the connecting wall is fixed in the sealing cavity, one end of each elastic wall is connected to one side of the connecting wall, and the pair of elastic walls block the second air-blowing ports of the two air-blowing channels respectively.

Further, the push rod comprises the rotating arm and the reset arm which are integrally arranged; a rotating center which is rotatably connected to the housing is provided in the middle of the rotating arm; one end of the rotating arm protrudes to one side to form an operating portion, and another end of the rotating arm is bent and extended to another side to form the air-blowing end; an arc-shaped sealing portion is disposed between the rotating center and the air-blowing end; a matching groove is formed between the sealing portion and the air-blowing end; the matching groove is in sliding fit with a sealing protrusion disposed on the housing; a rod body connected between the sealing portion and the rotating center has a fan-shaped structure; a circle center of the fan-shaped structure and a circle center of the arc-shaped sealing portion are located on a central axis of the rotating center; the reset arm is connected to a rod body between the operating portion and the rotating center; a middle part of the reset arm is bent to form at least two arc-shaped portions; and a clamping portion of the reset arm cooperates with the clamping groove formed in the housing, such that the reset arm deforms.

Further, the housing comprises two cover bodies; a first groove and a second groove are formed in one side, facing the push rod, of each cover body, and the first grooves of the two cover bodies are enclosed to form a mounting groove; a rotary mounting hole in which the push rod is rotatably assembled is formed in the middle of the mounting groove; the operating portion penetrates out of the mounting groove and cooperates with the operating mechanism; the second grooves of the two cover bodies are enclosed to form the sealing cavity; each cover body is provided with one air-blowing channel which is communicated with the sealing cavity; an opening through which are communicated with each other are formed between the mounting groove and the sealing cavity; the air-blowing end passes through the opening so as to extend into the sealing cavity; and a clamping groove which cooperates with the reset arm is formed in one side of the mounting groove close to the opening.

Further, middle parts of side walls of the sealing cavity protrude toward each other, such that the sealing cavity is segmented into a swing space and an expansion space; the swing space provides a motion space for the air-blowing end; and the insulating partition plate is assembled in the expansion space to block the air-blowing channel provided in the expansion space.

A molded case circuit breaker, comprising a shell, and the air-blowing tripping mechanism, the operating mechanism and an arc extinguishing system which are disposed in the shell, wherein the operating portion of the air-blowing tripping mechanism is provided correspondingly to the operating mechanism, and the air-blowing channel of the air-blowing tripping mechanism is communicated with the arc extinguishing system.

Further, at least two circuit breaker poles and at least one operating mechanism are disposed in the shell; each circuit breaker pole comprises a phase pole shell, and a contact mechanism and an arc extinguishing system disposed in the phase pole shell; an air-blowing tripping mechanism is disposed between two adjacent circuit breaker poles; and two adjacent phase pole shells cooperate with each other to form the housing rotatably connected to the push rod.

Further, at least two circuit breaker poles and at least one operating mechanism are disposed in the shell; each circuit breaker pole comprises a contact mechanism and an arc extinguishing system; an air-blowing tripping mechanism is disposed between two adjacent circuit breaker poles; and the arc extinguishing systems of the two circuit breaker poles are partitioned by the housing of the air-blowing tripping mechanism.

Further, the push rod of the air-blowing tripping mechanism is located between the two circuit breaker poles, two operating portions are disposed side by side at one end of the push rod, and an avoidance groove is formed between the two operating portions, and the two operating portions cooperate with the same operating mechanism, respectively.

Further, the air-blowing channel of the air-blowing tripping mechanism is communicated with the arc extinguishing system of adjacent circuit breaker pole; the arc extinguishing system comprises an arc extinguishing chamber; a first air-blowing port which is communicated with an interior of the arc extinguishing chamber is formed in one side or both sides of the middle of the arc extinguishing chamber; the first air-blowing port is communicated with one end of the air-blowing channel formed in the housing, and another end of the air-blowing channel serves as a second air-blowing port and is blocked by the insulating partition plate.

Further, the operating mechanism comprises a pair of brackets, and a rocker arm, a jump buckle, a lock buckle and re-buckle rotatably assembled on the pair of brackets respectively, wherein the rocker arm is provided with a handle and a rocker arm spring; the re-buckle is in limiting fit with the lock buckle; the operating portion of the push rod is opposite to the re-buckle to trigger the operating mechanism to trip; the connecting rod assembly comprises a first connecting rod and a second connecting rod; a rocker arm shaft is disposed at one end of the second connecting rod; the rocker arm is connected to the rocker arm shaft through the rocker arm spring; one end of the first connecting rod and one end of the second connecting rod are articulated through the rocker arm shaft; another end of the first connecting rod is connected to the jump buckle; and another end of the second connecting rod is connected to the linkage member.

Compared with the existing push rod which needs to be provided separately with a resetting mechanism, the push rod in the air-blowing tripping mechanism and the molded case circuit breaker of the present invention triggers the operating mechanism to trip in the event of a short-circuiting fault. After the tripping has been completed, the push rod is reset under the cooperation of the reset arm and the housing. Therefore, the present invention has the advantages of simple structure, high cooperation degree and low cost, and is conducive to improving the reliability of the air-blowing tripping mechanism.

In addition, the sealing portion disposed on the push rod can ensure a sealing state of the sealing cavity, especially by disposing the sealing protrusion at the opening of the sealing cavity to cooperate with the matching groove of the push rod, which provides a guiding effect for the swing of the push rod while ensuring its sealability.

In addition, the air-blowing tripping mechanism is disposed between the two circuit breaker poles, and the insulating partition plate disposed in the expansion space can block the second air-blowing ports of the two air-blowing channels at the same time, thereby saving an internal space and helping to ensure the functional stability of the insulating partition plate.

In addition, by disposing the housing provided separately with the push rod or by forming the housing under the cooperation of phase pole shells of the two circuit breaker poles, the air-blowing tripping mechanism may be applied to a double- or single-break-point circuit breaker, and has the advantage of a wide range of applications.

DETAILED DESCRIPTION OF THE PREFERRED EMBODIMENTS

The specific implementation of a molded case circuit breaker of the present invention will be further described below with reference to the embodiments given in FIGS. 1 to 14. The molded case circuit breaker of the present invention is not limited to the description of the following embodiments.

A molded case circuit breaker includes a shell in which at least one circuit breaker pole 1 and at least one operating mechanism 2 are disposed, wherein the operating mechanism 2 is used to drive the circuit breaker pole 1 for opening and closing actions. The operating mechanism 2 includes a jump buckle and a lock buckle which are in locking fit, a re-buckle 21 in limiting fit with the lock buckle, as well as a connecting rod assembly and a linkage member. Each circuit breaker pole 1 includes a contact mechanism and an arc extinguishing system. The contact mechanism is in linkage with the operating mechanism 2 through the linkage member, and the contact mechanisms of two adjacent circuit breaker poles 1 are in linkage through the linkage member, such that the operating mechanism 2 can synchronously drive all contact mechanisms in the circuit breaker poles 1 to synchronously perform opening and closing actions. Each arc extinguishing system is disposed oppositely to the contact mechanism, and is used to extinguish an electric arc generated by the opening and closing actions of the contact mechanism.

Figure 7:
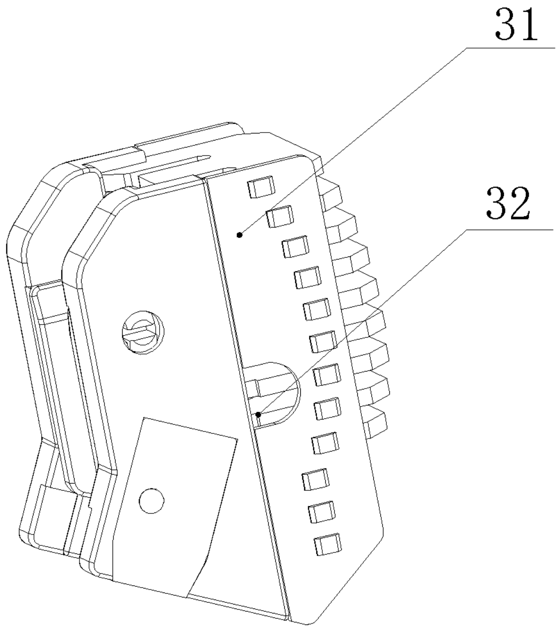
FIG. 7 is a schematic structural diagram of an arc extinguishing chamber in the present invention.

Specifically, the contact mechanism includes a moving contact and a static contact that cooperate with each other to switch on or off a circuit. When the contact mechanism is a double-break-point contact mechanism, the arc extinguishing systems are disposed in pairs in cooperation with a group of moving and static contacts. As shown in FIG. 7, the arc extinguishing system includes an arc extinguishing chamber 31 in which a plurality of laminated arc extinguishing grids is assembled. A first air-blowing port 32 which is communicated with the interior of the arc extinguishing chamber 31 is provided in one side or two sides of the arc extinguishing chamber 31. Further, in a multi-pole circuit breaker, each circuit breaker pole 1 may include a phase pole shell 11 for sealing the circuit breaker pole 1. Of course, a phase pole shell 11 may not be provided either.

Figure 1:
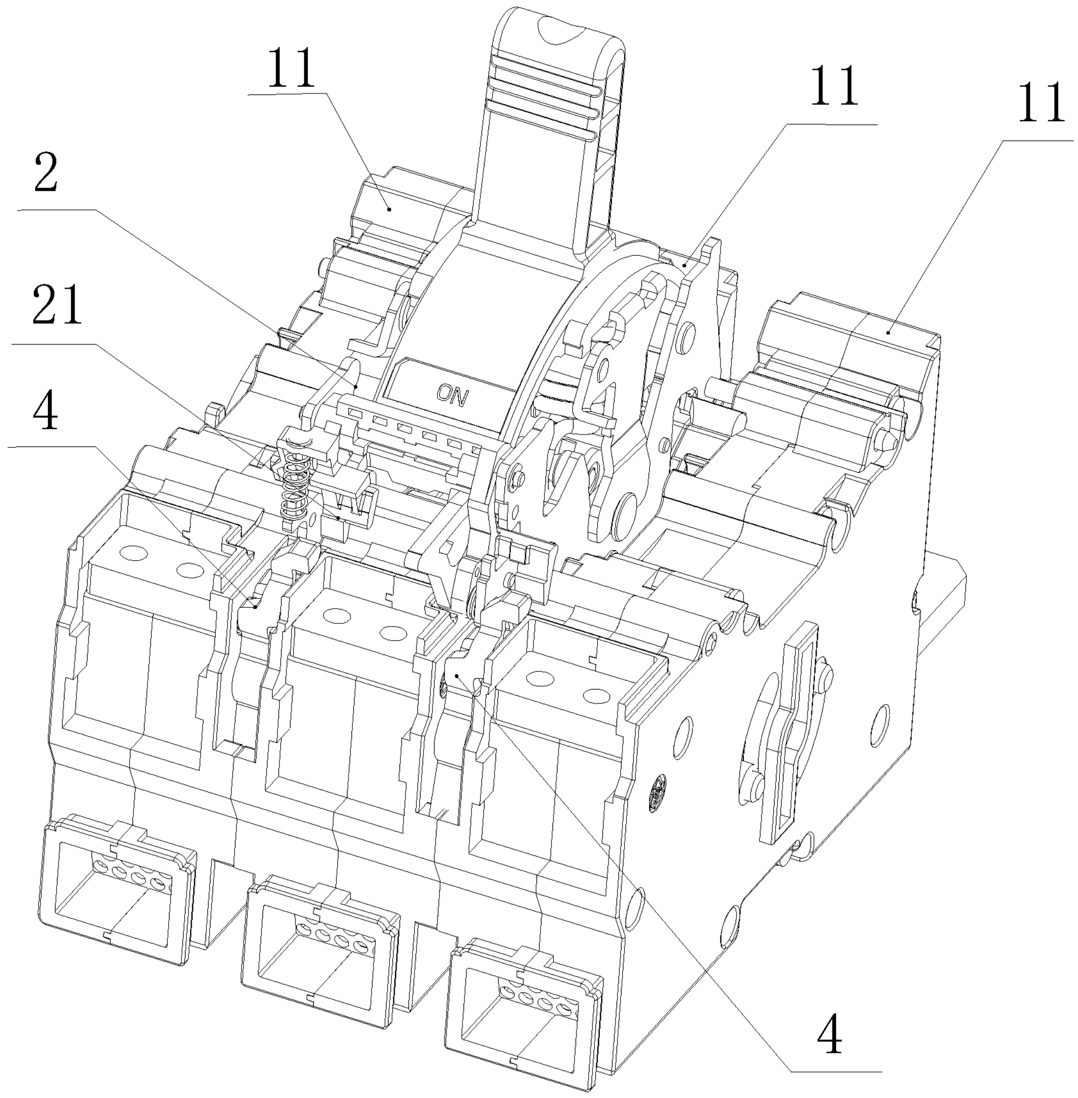
FIG. 1 is a schematic structural diagram (a first embodiment) of a molded case circuit breaker of the present invention.
Figure 9:
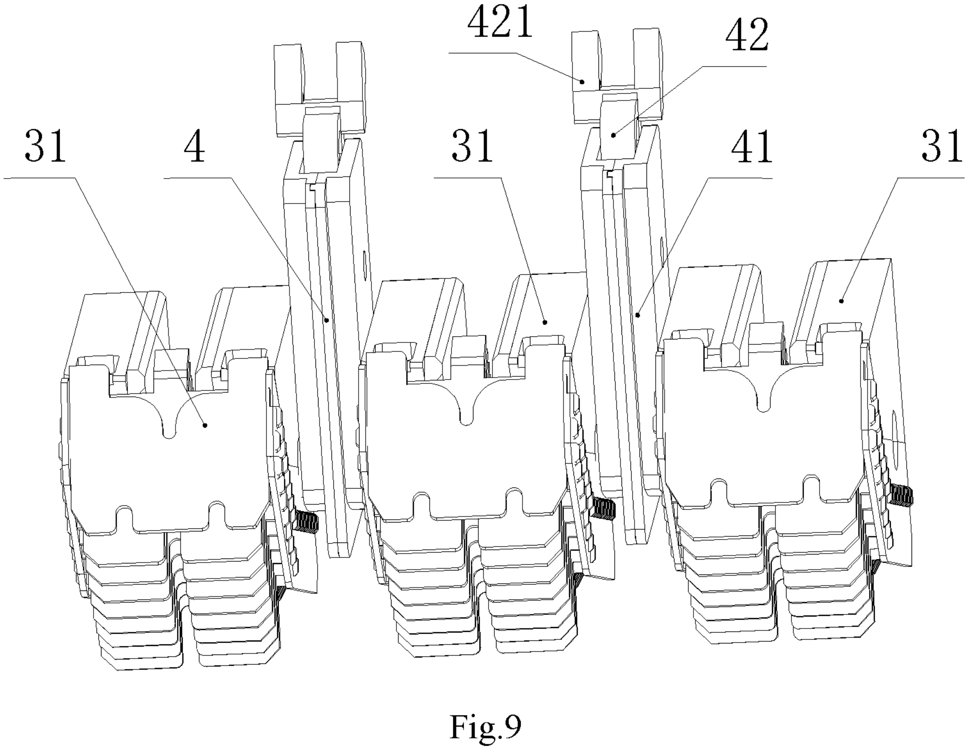
FIG. 9 is a schematic structural diagram (including three arc extinguishing systems) of an arc extinguishing chamber and an air-blowing tripping mechanism in a second embodiment of the present invention.

The present application is improved as follows: at least one air-blowing tripping mechanism 4 is also disposed in the shell, and located on one side of the circuit breaker pole 1. Preferably, as shown in FIG. 1 and FIG. 9, in the multi-pole circuit breaker, the air-blowing tripping mechanism 4 is disposed between two adjacent circuit breaker poles 1. The air-blowing tripping mechanism 4 includes a housing 41 and a push rod 42 rotatably connected to the housing 41. The housing 41 is provided with a sealing cavity. The sealing cavity is communicated with the arc extinguishing system of the adjacent circuit breaker pole 1 through an air-blowing channel 411. That is, the air-blowing channel 411 is communicated with the first air-blowing port 32 of the arc extinguishing chamber 31, and the air-blowing channel 411 is blocked by an insulating partition plate 43.

Figure 2:
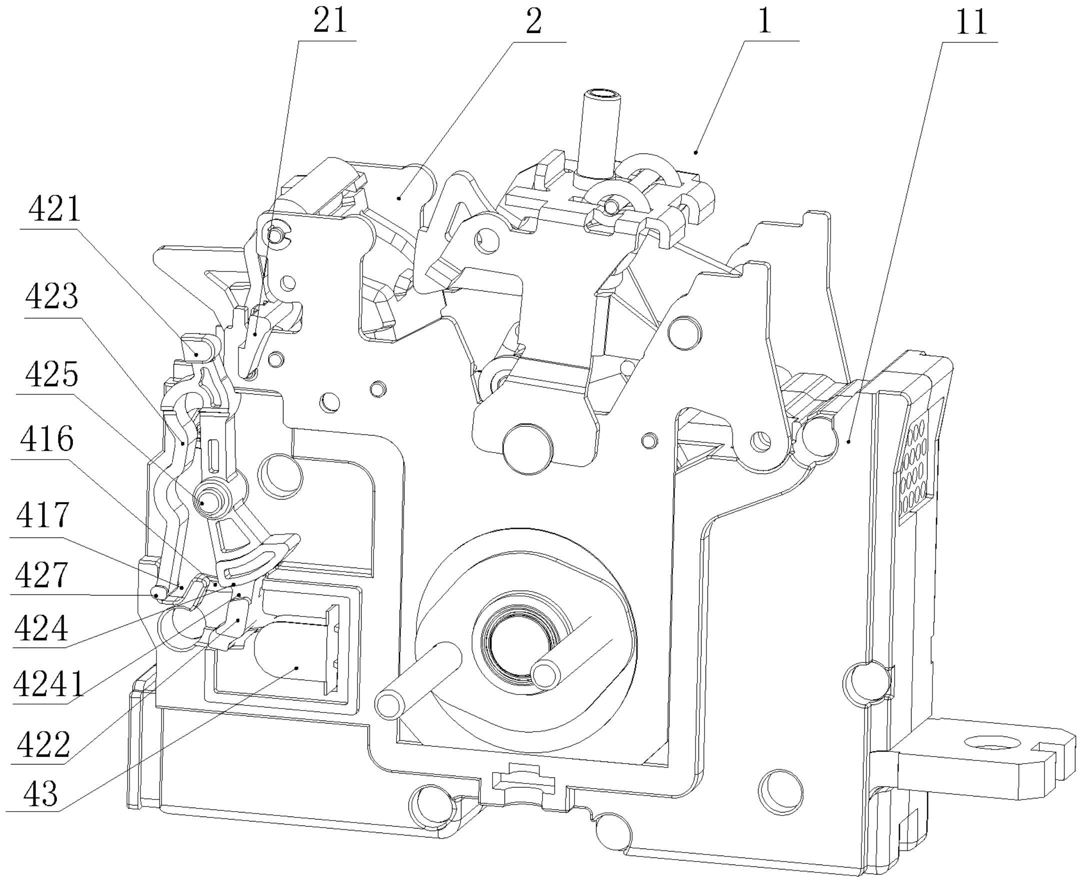
FIG. 2 is a schematic structural diagram (untripped) of a circuit breaker pole in the first embodiment of the present invention.
Figure 3:
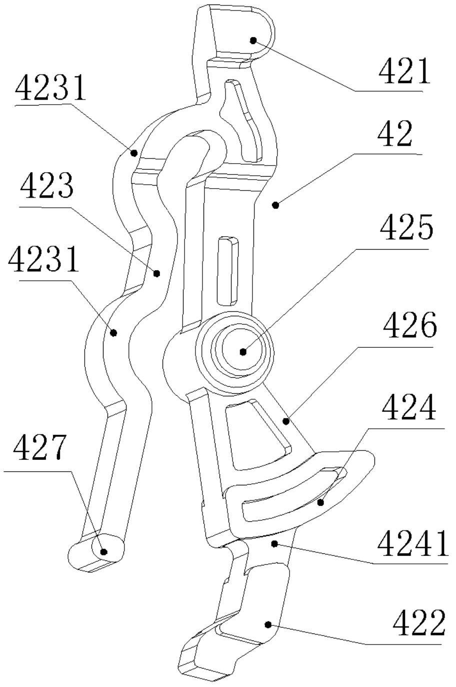
FIG. 3 is a schematic structural diagram of a push rod in FIG. 2.
Figure 4:
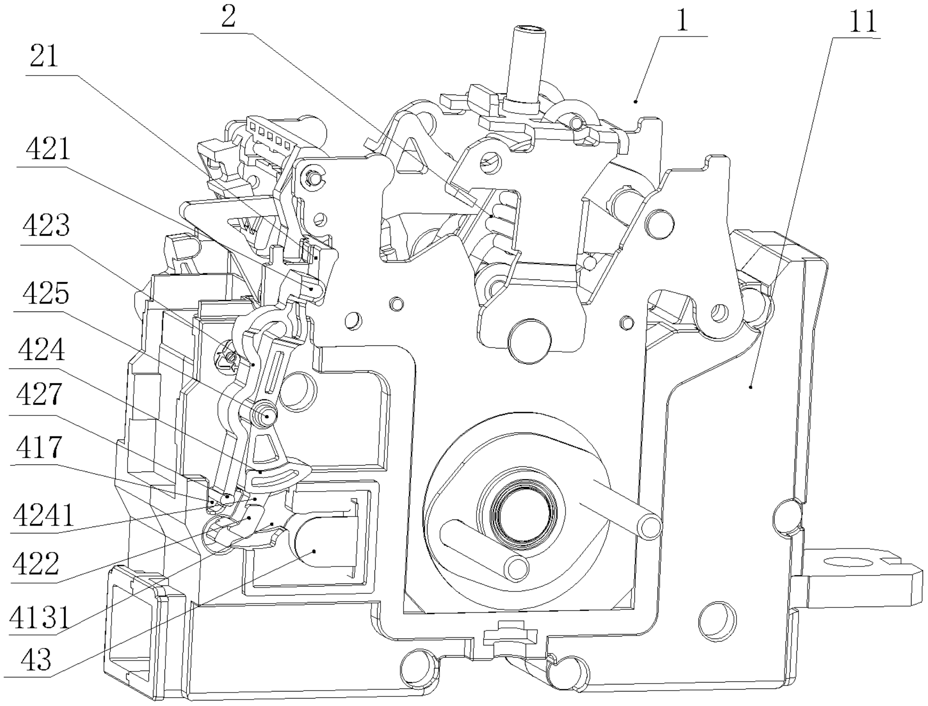
FIG. 4 is a schematic structural diagram (tripped) of the circuit breaker pole in the first embodiment of the present invention.
Figure 12:
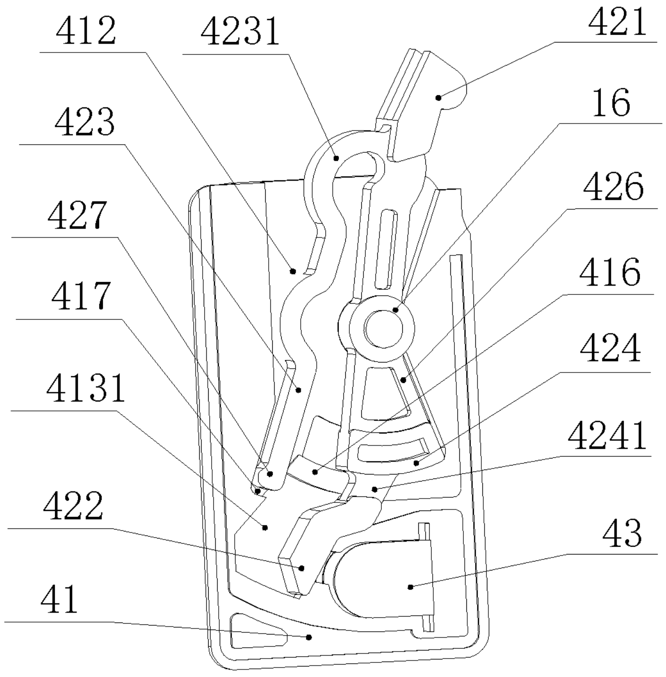
FIG. 12 is a schematic structural diagram of a push rod and a housing in the second embodiment of the present invention.
Figure 13:
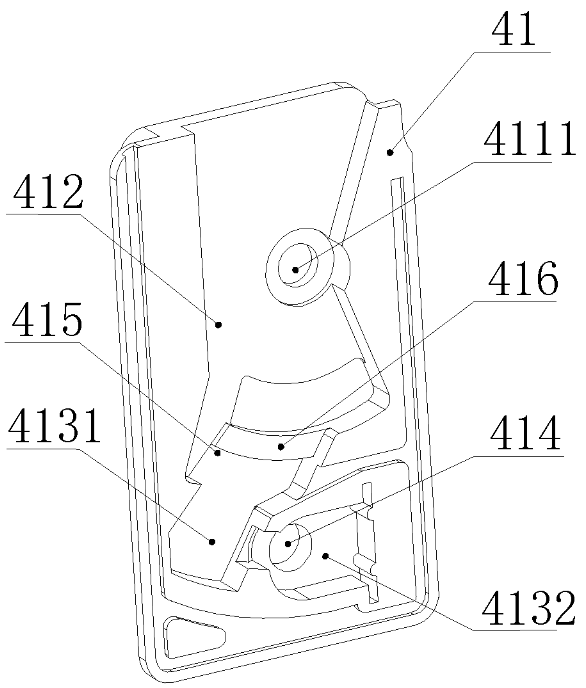
FIG. 13 is a schematic structural diagram (a side facing the push rod) of the housing in the second embodiment of the present invention.
Figure 14:
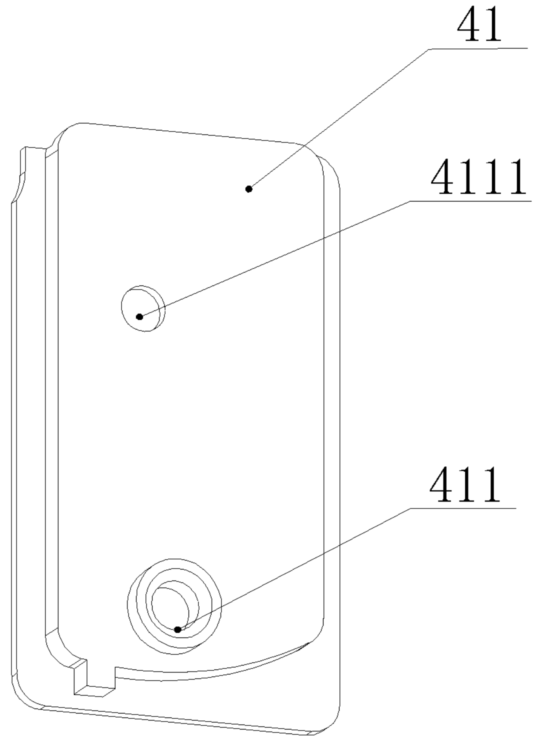
FIG. 14 is a schematic structural diagram (a side facing the arc extinguishing chamber) of the housing in the second embodiment of the present invention.

Preferably, as shown in FIGS. 2, 4 and 12, the insulating partition plate 43 is disposed in the sealing cavity; the push rod 42 includes a rotating arm and a reset arm 423 which are integrally arranged; the rotating arm is rotationally connected aside of the sealing cavity; one end of the rotating arm is provided with an operating portion 421 opposite to the operating mechanism 2, and the other end of the rotating arm is provided with an air-blowing end 422; the air-blowing end 422 extends into the sealing cavity, is located on one side of the insulating partition plate 43 and can drive the rotating arm to rotate under the action of a gas; and the elastic reset arm 423 is disposed on one side of the rotating arm and used for driving the push rod 42 to reset. In the event of a short-circuiting fault, a gas generated by the arc extinguishing system flows through the air-blowing channel 411, and blows the insulating partition plate 43 to move, such that the gas enters into the sealing cavity, so that the air-blowing end 422 drives the rotating arm to rotate under a gas pressure, and the operating portion 421 triggers the operating mechanism 2 to trip. The reset arm 423 is in fit with the housing 41 in order to deform (see FIGS. 4 and 5). After the tripping has been completed, the reset arm 423 and the adjustable fit restore to original positions to drive the push rod 42 to reset (see FIGS. 2 and 3).

Compared with the existing push rod 42 which needs to be provided separately with a resetting mechanism, the push rod 42 in the air-blowing trip mechanism 4 and the molded case circuit breaker equipped with the air-blowing tripping mechanism 4 triggers the operating mechanism 2 to trip in the event of a short-circuiting fault. After the tripping has been completed, the push rod 42 is reset under the cooperation of the reset arm 423 of the push rod 42 and the housing 41. Therefore, the present invention has the advantages of simple structure, high cooperation degree and low cost, and is conducive to improving the reliability of the air-blowing tripping mechanism 4.

A first embodiment is provided in conjunction with FIGS. 1 to 8. In this embodiment, the molded case circuit breaker is a multi-pole circuit breaker. In drawings, three circuit breaker poles 1 parallel arranged, an operating mechanism 2 and two air-blowing tripping mechanisms 4. Each circuit breaker pole 1 includes a phase pole shell 11. Three circuit breaker poles 1 are spliced together by their respective phase pole shells 11, and all phase pole shells 11 together constitute a shell of the molded case circuit breaker. A pair of arc extinguishing systems and contact mechanisms (not shown) are disposed in each phase pole shell 11, wherein a pair of arc extinguishing systems are assembled at both ends of the phase pole shell 11 respectively, and the contact mechanism is cooperatively disposed between the two arc extinguishing systems. The contact mechanism includes a pair of static contacts and a pair of moving contacts, and the pair of static contacts are disposed in one-to-one correspondence to the pair of arc extinguishing systems. Each moving contact includes a rotating shaft and two contact arms, wherein the two contact arms rotate along with the rotating shaft and cooperate with the two static contacts to form a double-break-point contact mechanism.

The operating mechanism 2 includes a pair of brackets, a rocker arm, a jump buckle, a lock buckle, a re-buckle 21, a connecting rod assembly and a linkage member, wherein the pair of brackets are disposed oppositely on both sides of the middle circuit breaker pole 1; the rocker arm is rotatably supported on the pair of brackets and is provided with a handle thereon; the rocker arm and the handle are located above the middle of the middle circuit breaker pole 1 to drive the circuit breaker for switching-off and switching-on actions; the rocker arm is connected to a rocker arm shaft disposed on the connecting rod assembly by means of a rocker arm spring; the jump buckle, the lock buckle, the re-buckle 21 and a drag rod are rotatably assembled on the inner upper part of the pair of brackets, respectively; the jump buckle is in locking fit with the lock buckle; the re-buckle 21 corresponds to one end of the middle circuit breaker pole 1, that is, to the upper side of one arc extinguishing system of the middle circuit breaker pole 1; the re-buckle 21 is in limiting fit with the lock buckle; the contact mechanism of the circuit breaker is correspondingly assembled to the lower part of the pair of brackets and is driven by the linkage member to perform switching-on and switching-off actions; an avoidance hole for the linkage member to pass through is formed in the lower part of the brackets; the linkage member passes through the avoidance hole and extends out of the brackets, and may be in linkage connection to the contact mechanism of other circuit breaker pole 1; the linkage member is connected to the jump buckle through the connecting rod assembly; preferably, the connecting rod assembly includes a first connecting rod and a second connecting rod, wherein a rocker arm shaft disposed at one end of the second connecting rod, one end of the first connecting rod and one end of the second connecting rod are articulated through the rocker arm shaft, the other end of the first connecting rod is connected to the jump buckle, and the other end of the second connecting rod is connected to the linkage member to drive the contact mechanism to perform switching-on and switching-off actions.

As shown in FIG. 1, the two air-blowing tripping mechanisms 4 are disposed between two adjacent circuit breaker poles 1, and each air-blowing tripping mechanism 4 cooperates with the re-buckle 21 of the operating mechanism 2 respectively for triggering the operating mechanism 2 to trip in the event of a short-circuiting fault. When the operating mechanism 2 is buckled, that is, when the jump buckle is in locking fit with the lock buckle and when the lock buckle is in limiting fit with the re-buckle 21, the handle can be used to drive the contact mechanism through the rocker arm to perform switching-on and switching-off actions. When the circuit fails, the air-blowing tripping mechanism 4 drives the re-buckle 21 to release the limiting fit from the lock buckle, so that the lock buckle releases the locking fit from the jump buckle, then the rocker arm resets, and the operating mechanism 2 trips. When the operating mechanism 2 trips, the rocker arm spring drives the contact mechanism to act.

Figure 6:
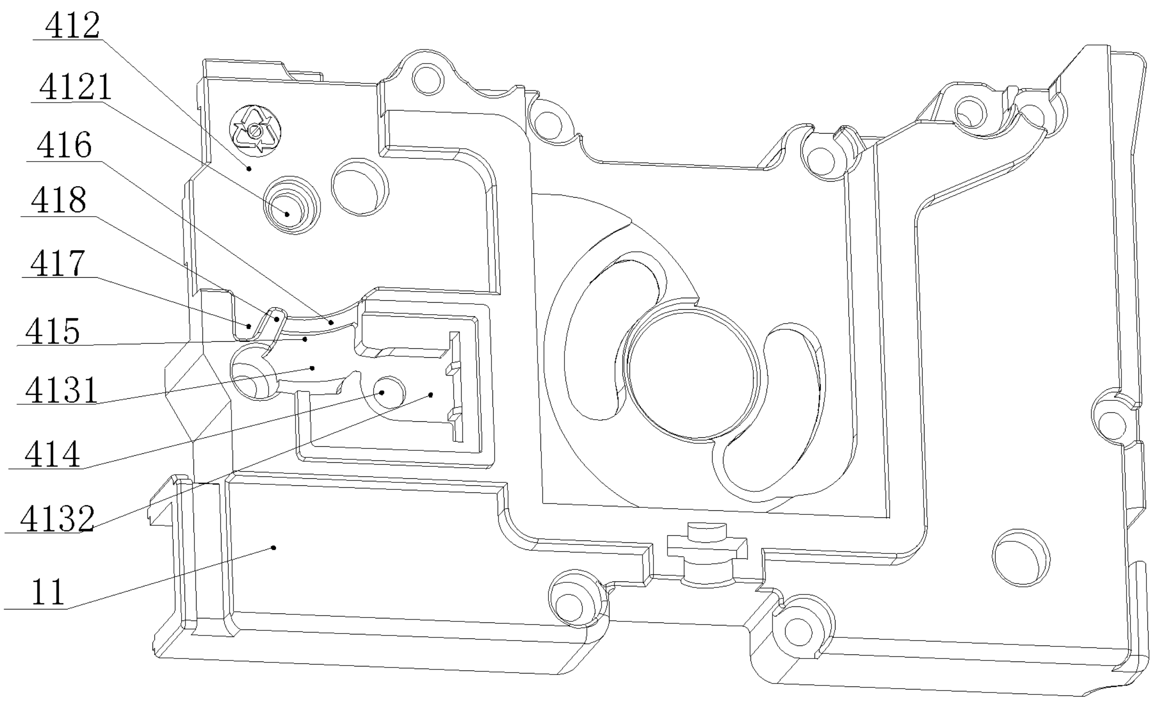
FIG. 6 is a schematic structural diagram of a phase pole shell in the first embodiment of the present invention.

In this embodiment, each air-blowing tripping mechanism 4 includes a housing 41 and a push rod 42 rotatably assembled on the housing 41, and the push rod 42 cooperates with the re-buckle 21 of the operating mechanism 2. As shown in FIGS. 2, 4 and 6, the housing 41 includes two cover bodies disposed oppositely to each other, and the two cover bodies are arranged side by side between the arc extinguishing systems of the two adjacent circuit breaker poles 1. In this embodiment, the housing 41 of the air-blowing tripping mechanism 4 is formed by means of joint fit of the phase pole shells 11 of the two adjacent circuit breaker poles 1. That is, the right side of the phase pole shell 11 in the left circuit breaker pole 1 and the left side of the phase pole shell 11 in the middle circuit breaker pole 1 are respectively used as two cover bodies respectively to form the housing 41 of the left air-blowing tripping mechanism 4, and the right side of the phase pole shell 11 in the middle circuit breaker pole 1 and the left side of the phase pole shell 11 in the right circuit breaker pole 1 are respectively used as a pair of cover bodies respectively to form the housing 41 of the right air-blowing tripping mechanism 4. Of course, the air-blowing tripping mechanism 4 may also be provided independently with the housing 41, and spliced with each phase electrode shell 11 by means of the housing 41. However, such a structure will increase the overall volume of the molded case circuit breaker, extend the length of the air-blowing channel 411 and have higher requirements for the tightness of the air-blowing channel 411, resulting in an increase in its cost.

As shown in FIG. 6, a first groove 412 and a second groove are formed in one side, facing the push rod 42, of each cover body, and the first grooves 412 of the two cover bodies are enclosed to form a mounting groove. A rotary mounting hole 4121 in which the push rod 42 is rotatably assembled is formed in the middle of the mounting groove. An operating portion 421 penetrates out of the mounting groove and cooperates with the re-buckle 21 of the operating mechanism 2. The second grooves of the two cover bodies are enclosed to form a sealing cavity. The air-blowing channel 411 which is communicated with the sealing cavity is formed in each cover body. Openings 415 through which are communicated with each other are formed between the mounting groove and the sealing cavity. Preferably, a sealing protrusion 416 is disposed to protrude from the sidewall of the housing 41 at the openings 415 to reduce the sizes of the openings 415. In FIG. 6, the sealing protrusion 416 is of an arc-shaped strip structure, and the circle center of a circular arc of this structure is located on a central axis of the rotary mounting hole 4121. The air-blowing end 422 extends into the sealing cavity through the opening 415. A clamping groove 417 which cooperates with the reset arm 423 is formed in one side of the mounting groove close to the opening 415, and a clamping portion 427 of the reset arm 423 cooperates with the clamping groove 417 to undergo an elastic deformation. In FIG. 6, a barrier portion 418 is disposed at one end of the sealing protrusion 416, and a gap between the barrier portion 418 and the sidewall of the mounting groove forms the clamping groove 417. The barrier portion 418 in FIG. 6 is obliquely connected to the left end of the sealing protrusion 416, thereby separating the opening 415 from the clamping groove 417.

The air-blowing channel 411 which penetrates through the cover is formed in one side of the sealing cavity away from the opening 415. One end of the air-blowing channel 411 is connected to the arc extinguishing system, that is, one end of the air-blowing channel 411 is communicated with the first air-blowing port 32 of the arc extinguishing chamber 31, and the other end of the air-blowing channel 411 serves as the second air-blowing port 414 blocked by the insulating partition plate 43. Specifically, as shown in FIG. 6, the middle parts of the sidewalls of the sealing cavity protrude toward each other to form a narrow connection region, so that the sealing cavity as a whole forms a cavity which is thick in two ends and thin in middle. Therefore, the sealing cavity is segmented by the protruding sidewalls into a swing space 4131 and an expansion space 4132. The opening 415 is located at one end of the swing space 4131, for the air-blowing end 422 to extend into the swing space 4131, and the swing space 4131 provides a motion space required by the air-blowing end 422. The insulating partition plate 43 is assembled in the expansion space 4132 for blocking the second air-blowing port 414. In the absence of a short-circuiting fault, the insulating partition plate 43 will be disposed to block the second air-blowing port 414 in the middle of the expansion space 4132. In the event of a short-circuiting fault, the expansion space 4132 provides a motion space for the insulated partition plate 43. In this embodiment, the air-blowing tripping mechanism 4 is correspondingly disposed between the arc extinguishing systems of the two circuit breaker poles 1, so that two air-blowing channels 411 are formed in the housing 41 and are communicated with the adjacent two arc extinguishing systems, respectively. That is, the sidewalls on both sides of the expansion space 4132 are each provided with a second air-blowing port 414. Preferably, the insulating partition plate 43 disposed in the sealed space may simultaneously block the two second air-blowing ports 414.

Figure 8:
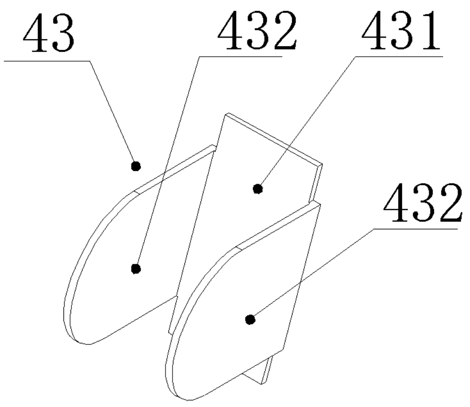
FIG. 8 is a schematic structural diagram of an insulating partition plate in the present invention.

A specific structure of the insulating partition plate 43 is provided according to FIGS. 2, 4 and 8. The insulating partition plate 43 is a U-shaped insulating partition plate 43 and includes a connecting wall 431 and a pair of elastic walls 432, wherein the connecting wall 431 is fixed in the sealing cavity on one side away from the opening 415 in a direction perpendicular to the two cover bodies, that is, fixed on the side of the expansion space 4132 away from the swing space 4131. One end of each elastic wall 432 is connected to one side of the connecting wall 431, the other end of the elastic wall 432 is adjacent to the air-blowing end 422, the middle of the elastic wall 432 is fitted to the bottom wall of the sealing cavity of each cover body, so that the second air-blowing port 414 is blocked, and the two elastic walls 432 block the two second air-blowing ports 414 respectively. Due to the connecting wall 431 vertically arranged, one end of the elastic wall 432 moves away from or close to the second air-blowing port 414 in a direction perpendicular to the bottom wall of the sealing cavity. This structure can save the internal space and is conducive to ensuring the functional stability of the insulating partition plate 43.

Figure 5:
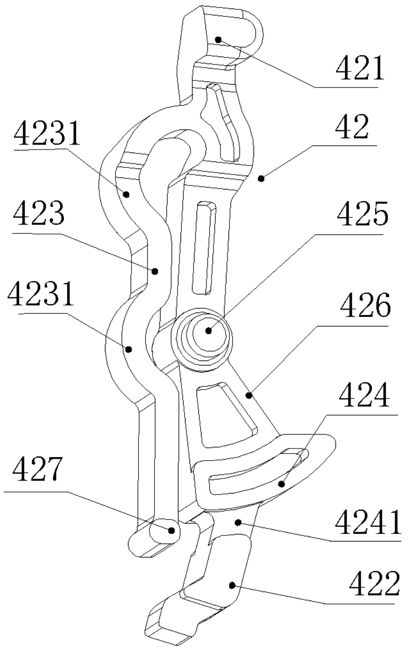
FIG. 5 is a schematic structural diagram of the push rod in FIG. 4.

As shown in FIGS. 3-5, the push rod 42 includes a rotating arm and a reset arm 423 which are integrally formed, wherein a rotating center 425 rotatably connected to the housing 41 is provided in the middle of the rotating arm, and one end of the rotating arm protrudes to one side to form the operating portion 421. In this embodiment, the push rod 42 cooperates with the re-buckle 21 of the same operating mechanism 2, and only one operation portion 421 is provided; the other end of the rotating arm is bent and extended to the other side to form the air-blowing end 422, and the air-blowing end 422 in the figure forms a rod-like structure bent in a direction of facing away from the operating portion 421; an arc-shaped sealing portion 424 is disposed between the rotating center 425 and the air-blowing end 422, two ends of the sealing portion 424 protrude out of both sides of the rotating arm respectively, and the overall length of the arc surface of the sealing portion 424 which blocks the opening 415 is greater than the opening length of the opening 415; and during the swing course of the push rod 42, the sealing portion 424 always blocks the opening 415, or always blocks the side of the opening 415 close to the air-blowing channel 411. In this embodiment, the sealing portion 424 always blocks the side of the opening 415 close to the air-blowing channel 411, thereby achieving a sealing effect through the sealing portion 424 and the air-blowing end 422 together. The sidewall between the sealing portion 424 and the air-blowing end 422 is provided with a matching groove 4241 corresponding to the sealing protrusion 416, and the matching groove 4241 is in sliding fit with the sealing protrusion 416 disposed on the housing 41, wherein the matching groove 4241 and the sealing protrusion 416 are each of an arc-shaped strip structure, and the circle center of the matching groove 4241 and the circle center of the sealing protrusion 416 are located on the central axis of the rotating center 425. When the push rod 42 rotates around the rotating center 425, the matching groove 4241 and the sealing protrusion 416 cooperates with each other and is in sliding fit, so that the sealing portion 424 can block the opening 415, and then the sealing performance of the sealing cavity in the swing process of the push rod 42 can be reliably guaranteed. In addition, the sliding fit between the matching groove 4241 and the sealing protrusion 416 also provides a guiding effect for the rotation of the push rod 42, avoiding the swing of the push rod 42 in other directions. A rod body connected between the sealing portion 424 and the rotating center 425 has a fan-shaped structure 426. The circle center of the fan-shaped structure 426 and the circle center of the arc-shaped sealing portion 424 are located on the central axis of the rotating center 425, and the sealing portion 424 is a fan-shaped surface of the arc shape of the fan-shaped structure 426. One end of the reset arm 423 is connected to the rotating arm, specifically connected to the rod body between the operating portion 421 and the rotating center 425. There is a gap between the reset arm 423 and the rotating arm, and a clamping portion 427 is disposed at the other end of the reset arm 423. During the rotation of the push rod 42, the clamping portion 427 props within the clamping groove 417 formed in the housing 41, such that the reset arm 423 undergoes an elastic deformation. Further, the reset arm 423 is provided with a plurality of curved arc-shaped portions 4231. In this embodiment, the middle of the reset arm 423 is bent to form two arc-shaped portions 4231, which are conducive to enhancing the structural strength of the reset arm 423, not only increasing the elasticity, but also preventing the fracture due to the elastic deformation. In the drawings, a bluntly circular clamping portion 427 is formed at the end of the reset arm 423, and extends into the clamping groove 417. In the absence of a short-circuiting fault, the operating portion 421 is opposite to but not in contact with the re-buckle 21. At this time, there is a gap between the reset arm 423 and the rotating arm, and the clamping portion 427 cooperates with the clamping groove 417. In the event of a short-circuiting fault, the air-blowing end 422 is blown to cause the operating portion 421 to trigger the re-buckle 21. At this time, the air-blowing end 422 swings in a direction of the clamping portion 427, and the reset arm 423 is elastically squeezed in this process in response to the clamping portion 427 propping against the clamping groove 417, so that the gap between the reset arm 423 and the rotating arm decreases. After the tripping has been completed, the pressure of air for blowing the air-blowing end 422 disappears, the reset arm 423 restores to its original state in response to the clamping portion 427 propping against the clamping groove 417, to drive the rotating arm to swing back, the gap between the rotating arm and the reset arm 423 gradually increases to the original state, and the push rod 42 then returns to its original state. It should be noted that the clamping portion 427 may also be disposed in other positions of the reset arm 423. Correspondingly, the position of the clamping portion 417 cooperating with the clamping portion 427 may also change accordingly. Further, the reset arm 423 may be provided with an avoidance structure to ensure smooth rotation of the push rod 42.

A second embodiment of a molded case circuit breaker is provided according to FIGS. 9-14. In this embodiment, the molded case circuit breaker is a multi-pole circuit breaker. Taking three circuit breaker poles 1 parallel arranged, one operating mechanism 2 and two air-blowing tripping mechanisms 4 as an example, each circuit breaker pole 1 includes an arc extinguishing system and a contact mechanism; and the operating mechanism 2 includes a rocker arm, a jump buckle, a lock buckle, a re-buckle 21 and a linkage assembly, and has the same connection mode and action principle as that in the first embodiment, and the operating mechanism 2 is in linkage connection with the contact mechanism. In this embodiment, the contact mechanism is a single-breaking-point contact mechanism. The contact mechanism includes a moving contact and a static contact that cooperate with each other, and the arc extinguishing system is disposed on one side of the static contact and is located at one end of a circuit breaker pole 1. The arc extinguishing system includes an arc extinguishing chamber 31 in which a plurality of laminated arc extinguishing grids is disposed, and a first air-blowing port 32 which is communicated with the interior of the arc extinguishing chamber 31 is provided on one side or both sides of the arc extinguishing chamber 31.

Figure 10:
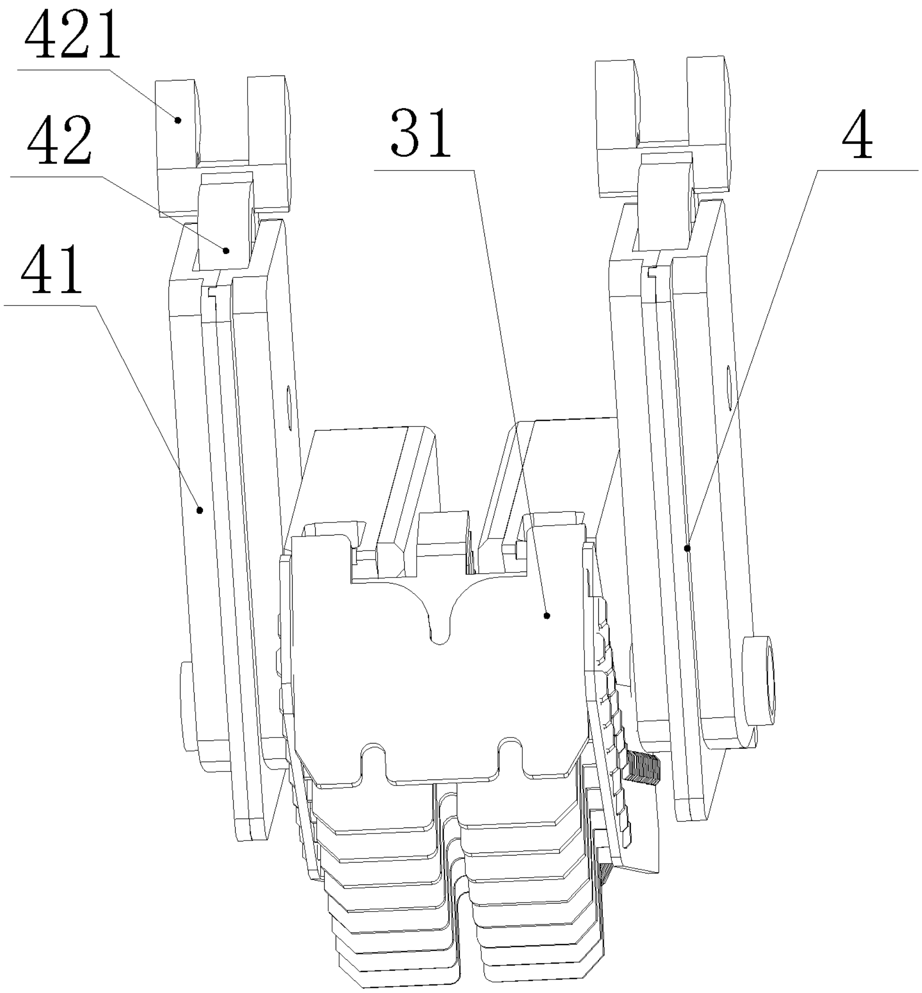
FIG. 10 is a schematic structural diagram (including one arc extinguishing system) of the arc extinguishing chamber and the air-blowing tripping mechanism in the second embodiment of the present invention.

As shown in FIG. 9 and FIG. 10, two air-blowing tripping mechanisms 4 are respectively disposed between two adjacent circuit breaker poles 1, and each air-blowing tripping mechanism 4 is located at one end where the arc extinguishing system is arranged. In this embodiment, each circuit breaker pole 1 is not provided with a phase pole shell 11. The arc extinguishing systems of the two adjacent circuit breaker poles 1 are partitioned by the housing 41 of the air-blowing tripping mechanism 4. The housing 41 includes two opposite cover bodies, the push rod 42 is rotatably assembled between the two cover bodies, and the operating portion 421 of the push rod 42 extends out of one end of the housing 41 and cooperates with the operating mechanism 2.

Specifically, as shown in FIGS. 11-14, a first groove 412 and a second groove which are the same as those in the first embodiment are formed in one side of each cover body. The first grooves 412 and the second grooves of the two cover bodies are enclosed to form a mounting groove and a sealing cavity respectively, wherein the mounting groove and the sealing cavity are communicated through an opening 415. A sealing protrusion 416 is formed to protrude from the inner wall of the housing 41 of the opening 415. The sealing protrusion 416 is the same as that in the first embodiment, both are of an arc-shaped strip structure, except that: a barrier portion 418 is not disposed at one end of the sealing protrusion 416, and a gap between one end of the sealing protrusion 416 and the sidewall of the mounting groove is used directly as the clamping groove 417 to prop against the clamping portion 427 of the reset arm 423.

In this embodiment, the sealing cavity is also separated by the protruding sidewall into the same swing space 4131 and expansion space 4132 as those in the first embodiment. An air-blowing channel 411 which penetrates through the cover body is formed in the middle of the expansion space 4132. The second air-blowing port 414 of the air-blowing channel 411 is located in the expansion space 4132 and is blocked by an insulating partition plate 43. The insulating partition plate 43 employs the same U-shaped structure as the first embodiment, so that two second air-blowing ports 414 can be simultaneously blocked.

Figure 11:
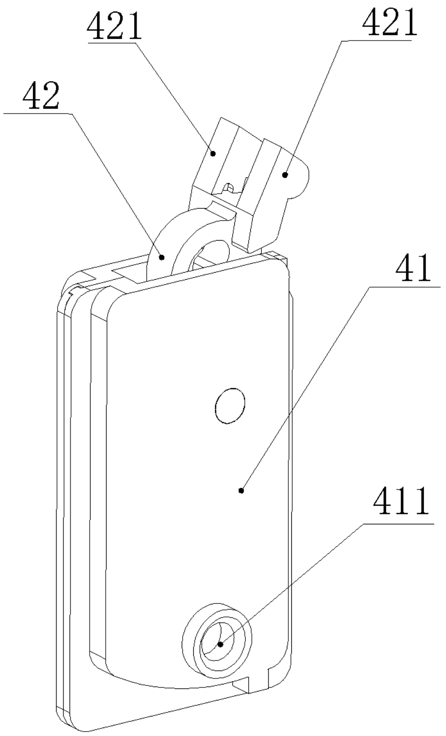
FIG. 11 is a schematic structural diagram of the air-blowing tripping mechanism in the second embodiment of the present invention.

As shown in FIG. 11 and FIG. 12, the push rod 42 in this embodiment includes a reset arm 423 and a rotating arm, wherein the reset arm 423 is identical to the reset arm in the first embodiment, except for two parallel operating portions 421 disposed in the rotating arm, and the remaining portions are identical with those in the first embodiment. Further, the structure of the two operating portions 421 has the same shape as the operating portion 421 in the first embodiment, the two parallel operating portions 421 cooperate with the same operating mechanism 2 respectively, and an avoidance groove is formed between the two parallel operating portions 421 to avoid interfering with the cooperation of the operating portion 421 and the operating mechanism 2.

It should be noted that in the multi-pole circuit breaker, the number of the operating mechanism 2 is not limited to 1, the air-blowing tripping mechanism 4 may be disposed on both sides of each operating mechanism 2, on either side of each operating mechanism 2, or on both sides or one side of one of the operating mechanisms 2, and the rest of the operating mechanisms 2 are operated by linkage, but its tripping protection effect is not as good as that of the air-blowing tripping mechanisms 4 disposed on both sides of the operating mechanism 2.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

The invention claimed is:

1. An air-blowing tripping mechanism, comprising a housing and a push rod rotationally connected to the housing, the housing is provided with a sealing cavity provided with an air-blowing channel, the air-blowing channel is blocked by an insulating partition plate, and a gas is able to blow the insulating partition plate to move, so as to enter into the sealing cavity; wherein the push rod comprises a rotating arm and a reset arm which are integrally arranged; the rotating arm is rotationally connected and a rotational joint of the rotating arm is on one side of the sealing cavity; a rotating center which is rotatably connected to the housing is provided in a middle of the rotating arm, one end of the rotating arm is provided with an operating portion opposite to an operating mechanism of a circuit breaker, and another end of the rotating arm is provided with an air-blowing end; the air-blowing end extends into the sealing cavity, is located on one side of the insulating partition plate and can drive the rotating arm to rotate under an action of the gas; and the reset arm, which is elastic, is disposed on one side of the rotating arm and used for driving the push rod to reset;

an opening through which the air-blowing end extends is formed on one side of the sealing cavity; the air-blowing end extends into the sealing cavity through the opening; a sealing portion is disposed between the rotating center and the air-blowing end, a sealing protrusion is disposed at the opening, a matching groove is correspondingly formed in a sidewall between the sealing portion and the air-blowing end;

and during a swing course of the push rod, the matching groove is in sliding fit with the sealing protrusion, the sealing portion blocks the opening to keep the sealing cavity in a sealed state; a length of an arc-shaped surface of the sealing portion that blocks the opening is greater than an opening length of the opening, and during the swing course of the push rod, the sealing portion always blocks the opening, or always blocks a side of the opening close to the air-blowing channel.

2. The air-blowing tripping mechanism according to claim 1, wherein one end of the reset arm is connected to the rotating arm; a gap is reserved between the reset arm and the rotating arm; a clamping portion is disposed at another end of the reset arm; and the clamping portion props within a clamping groove formed on the housing.

3. The air-blowing tripping mechanism according to claim 1, wherein the reset arm is provided with a plurality of curved arc-shaped portions.

4. The air-blowing tripping mechanism according to claim 1, wherein two air-blowing channels are respectively provided on both sides of the sealing cavity; one end of each of the two air-blowing channels is communicated with an arc extinguishing system of an adjacent circuit breaker pole, and another end of each of the two air-blowing channels serves as a second air-blowing port and is blocked by an insulating partition plate; the insulating partition plate is of U-shaped and disposed in the sealing cavity; and the insulating partition plate comprises a connecting wall and a pair of elastic walls, wherein the connecting wall is fixed in the sealing cavity, one end of each elastic wall is connected to one side of the connecting wall, and the pair of elastic walls block the second air-blowing ports of the two air-blowing channels respectively.

5. The air-blowing tripping mechanism according to claim 1, wherein a rod body connected between the sealing portion and the rotating center has a fan-shaped structure; a circle center of the fan-shaped structure and a circle center of the arc-shaped sealing portion are located on a central axis of the rotating center; the reset arm is connected to a rod body between the operating portion and the rotating center; a middle part of the reset arm is bent to form at least two arc-shaped portions; and a clamping portion of the reset arm cooperates with a clamping groove formed in the housing, such that the reset arm deforms.

6. The air-blowing tripping mechanism according to claim 1, wherein the housing comprises two cover bodies; a first groove and a second groove are formed in one side, facing the push rod, of each cover body, and the first grooves of the two cover bodies are enclosed to form a mounting groove; a rotary mounting hole in which the push rod is rotatably assembled is formed in a middle of the mounting groove; the operating portion penetrates out of the mounting groove and cooperates with the operating mechanism; the second grooves of the two cover bodies are enclosed to form the sealing cavity; each cover body is provided with one air-blowing channel which is communicated with the sealing cavity; an opening through which are communicated with each other are formed between the mounting groove and the sealing cavity; the air-blowing end passes through the opening so as to extend into the sealing cavity; and a clamping groove which cooperates with the reset arm is formed in one side of the mounting groove close to the opening.

7. The air-blowing tripping mechanism according to claim 1, wherein middle parts of side walls of the sealing cavity protrude toward each other, such that the sealing cavity is segmented into a swing space and an expansion space; the swing space provides a motion space for the air-blowing end; and the insulating partition plate is assembled in the expansion space to block the air-blowing channel provided in the expansion space.

8. A molded case circuit breaker, comprising a shell, and the air-blowing tripping mechanism according to claim 1, the operating mechanism and an arc extinguishing system which are disposed in the shell, wherein the operating portion of the air-blowing tripping mechanism is provided correspondingly to the operating mechanism, and the air-blowing channel of the air-blowing tripping mechanism is communicated with the arc extinguishing system.

9. The molded case circuit breaker according to claim 8, wherein at least two circuit breaker poles and at least one operating mechanism are disposed in the shell; each circuit breaker pole comprises a phase pole shell, and a contact mechanism and the arc extinguishing system disposed in the phase pole shell; the air-blowing tripping mechanism is disposed between two adjacent circuit breaker poles; and two adjacent phase pole shells cooperate with each other to form the housing rotatably connected to the push rod.

10. The molded case circuit breaker according to claim 9, wherein the air-blowing channel of the air-blowing tripping mechanism is communicated with the arc extinguishing system of adjacent circuit breaker pole; the arc extinguishing system comprises an arc extinguishing chamber; a first air-blowing port which is communicated with an interior of the arc extinguishing chamber is formed in one side or both sides of a middle of the arc extinguishing chamber; the first air-blowing port is communicated with one end of the air-blowing channel formed in the housing, and another end of the air-blowing channel serves as a second air-blowing port and is blocked by the insulating partition plate.

11. The molded case circuit breaker according to claim 8, wherein at least two circuit breaker poles and at least one operating mechanism are disposed in the shell; each circuit breaker pole comprises a contact mechanism and the arc extinguishing system; the air-blowing tripping mechanism is disposed between two adjacent circuit breaker poles, and the arc extinguishing systems of the two circuit breaker poles are partitioned by the housing of the air-blowing tripping mechanism.

12. The molded case circuit breaker according to claim 11, wherein the push rod of the air-blowing tripping mechanism is located between the two circuit breaker poles, two operating portions are disposed side by side at one end of the push rod, and an avoidance groove is formed between the two operating portions, and the two operating portions cooperate with a same operating mechanism, respectively.

* * * * *